United States Patent [19]

Moskowitz et al.

[11] 4,305,670

[45] Dec. 15, 1981

[54] LIQUID MIXING DEVICE

[75] Inventors: Paul M. Moskowitz, Brooklyn; Yuliy Rushansky, Bronx, both of N.Y.

[73] Assignee: Salton, Inc., Bronx, N.Y.

[21] Appl. No.: 128,043

[22] Filed: Mar. 7, 1980

[51] Int. Cl.³ .............................. B01F 7/00; B01F 7/26
[52] U.S. Cl. .................................... 366/197; 366/317; 366/343
[58] Field of Search ........ 366/197, 199, 201, 205–207, 366/315, 317, 342–344

[56] References Cited

U.S. PATENT DOCUMENTS

| | | | |
|---|---|---|---|
| 1,611,281 | 12/1926 | Ruggaber | 366/197 |
| 1,973,091 | 9/1934 | Miller | 366/207 |
| 2,590,581 | 3/1952 | Shirley | 366/343 |

Primary Examiner—Philip R. Coe
Assistant Examiner—Timothy F. Simone
Attorney, Agent, or Firm—Edward D. O'Brian

[57] ABSTRACT

An improved liquid mixing device or mixer can be constructed so as to utilize a disk having flat upper and lower surfaces as a boundary layer type rotor for causing fluid movement. This disk is mounted on a shaft which is supported and coupled to a motor in such a manner that vibration is not transmitted to the shaft as the motor is operated so as to turn the shaft. Such a liquid mixing device is considered to be primarily valuable for use in mixing a wide variety of various types of beverages.

1 Claim, 2 Drawing Figures

LIQUID MIXING DEVICE

BACKGROUND OF THE INVENTION

The invention set forth in this specification pertains to new and improved liquid mixing devices or mixers. More specifically it is primarily directed towards liquid mixing devices which can be utilized for a variety of different purposes such as mixing various types of bar drinks, milkshakes, breakfast drinks and the like but which can also be utilized for such functions as mixing various types of batters, beating eggs, whipping cream and the like. Liquid mixers which are closely related to the mixers of the present invention are sometimes generically classified as beverage mixers.

Such beverage mixers have been commonly constructed so as to include a vertically extending support holding a housing generally above and forwardly from the support. In such a mixer normally an electric motor is mounted within the housing so that its shaft extends generally vertically. Although in some cases the shaft of the motor is constructed so as to extend downwardly from the motor it is common in mixers of the type indicated to mechanically secure a downwardly extending shaft to the motor shaft. In either case a mixing structure or element for causing fluid motion is normally located on the extremity of a shaft below the motor. When a common beverage mixer as noted is used a container or vessel such as a glass or the like containing the ingredients to be mixed with the mixer is located generally around the structure or element for causing fluid movement.

A number of different mixing elements or structures have been commonly utilized in such mixers for the purposes of causing fluid movement of ingredients and of mixing air with such ingredients. It is not considered that an understanding of the present invention requires a detailed discussion of all prior mixing structures or elements. A wide variety of different types of fluted disks, propellers and the like have been commonly used as such elements or structures. All of such prior fluid movement elements or structures are considered to be utilitarian to at least a degree. However, problems have been encountered with the use of beverage mixers as herein indicated constructed so as to utilize such common fluid movement structures and elements.

One type of problem concerns the possibility of damage to the vessel or container employed with such a beverage mixer to contain the liquid or liquid mixture. Normally after the liquid mixture has been prepared using the complete mixer the container or vessel is removed from the mixer after the motor is shut off but while the mixing element or structure is still rotating. When this occurs there is a significant danger of damage occurring as a result of contact between the mixing element or structure and the container or vessel. This is particularly the case when such a container or vessel is made of glass.

Another problem which has been encountered during the use of beverage mixers as equipped with common mixing structures or elements concerns the movement of the liquid within such a vessel or container as the motor is operated. Frequently what may be regarded as a form of resonance is set up within such a liquid or liquid mixture which causes the upper level of the liquid or liquid mixture to continuously rise and fall within the container or vessel. Although in a sense at times this can be advantageous as promoting contact with the ambient air it can also be disadvantageous because of the possibility of the liquid spilling over the upper edge of the container or vessel. It is possible to enter into a discussion as to whether or not such up and down surging of the liquid does or does not influence the effectiveness of the mixing action obtained.

A number of other matters concerning the operation of beverage mixers of the type broadly indicated equipped with various types of mixing elements or structures could be discussed in this specification. Also this specification could be encumbered by detailed discussion as to the relative merits of prior types of mixing or fluid movement stirring and similar devices as have been employed in such beverage mixers. It is not considered that an understanding of it requires such a detailed discussion. It is considered, however, that an understanding of the invention set forth in this specification requires an understanding of the fact that beverage mixers of the type indicated in the preceding discussion and the mixing elements or structures used as parts of such mixers have been of such a character as to make it desirable to improve such structures.

BRIEF SUMMARY OF THE INVENTION

Broadly the present invention is intended to provide new and improved liquid mixing devices or mixers. The invention is also intended to provide mixers such as beverage mixers which can be utilized without any significant danger of the containers or vessels used with such mixers becoming damaged as they are removed from such mixers. The invention is also intended to provide mixers such as beverage mixers which are relatively unique in that very little surging of the liquid level occurs within the container or vessel used with such a mixer as the mixer itself is operated. The invention set forth in this specification is also intended to provide beverage mixers as described which may be easily and conveniently constructed at a comparitively nominal cost and which are effective in mixing various types of liquids such as are commonly mixed within beverage mixers efficiently in a comparitively short period of time.

These various objects of the invention are achieved by providing a mixing device having a support, a motor mounted on said support, said motor having a rotatable output shaft, another shaft located in a generally vertical direction, the upper end of said other shaft being operatively connected to said output shaft so that operation of said motor causes rotation of said other shaft and fluid movement means located on said other shaft remote from the upper end of said other shaft in which the improvement comprises: vibration absorbing means mechanically coupling said other shaft and said output shaft and supporting said other shaft so that vibration resulting from the operation of said motor will not cause the position of the axis of rotation of said other shaft to change as said motor is operated and; said fluid movement means comprises a disk having flat upper and lower surfaces and a smooth periphery attached to said other shaft so as to extend outwardly around said other shaft in a plane perpendicular to the axis of rotation of said other shaft, said disk being located symmetrically with respect to said other shaft.

BRIEF DESCRIPTION OF THE DRAWING

Because of the nature of this invention it is best more fully explained with reference to the accompanying drawing in which.

Figure 1:
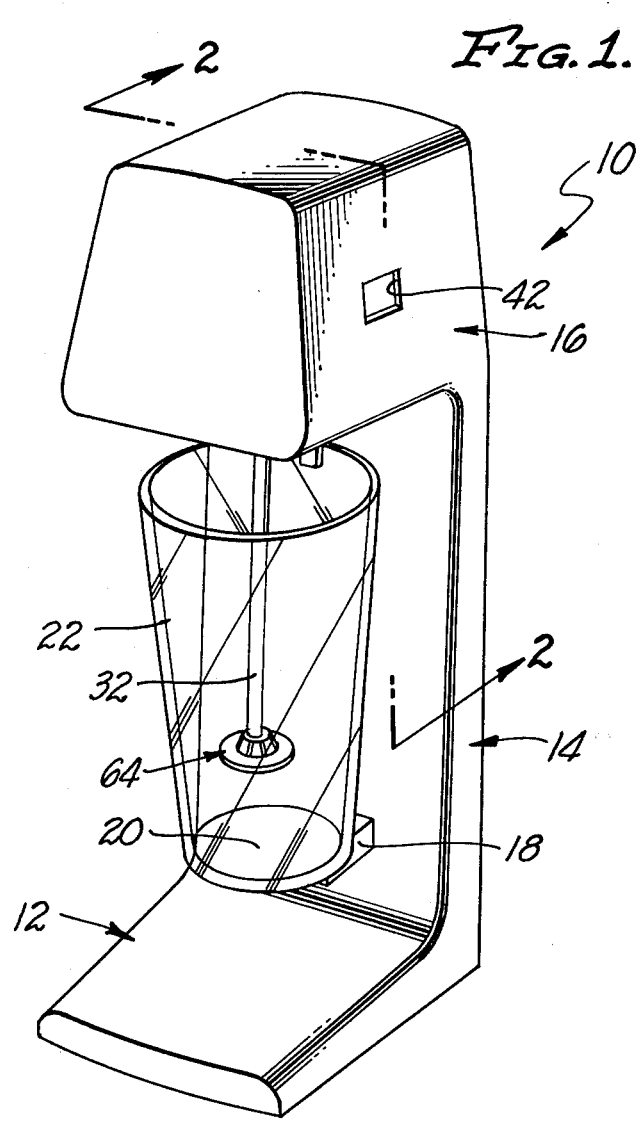
FIG. 1 is an isometric view of a presently preferred embodiment or form of a liquid mixing device or mixer in accordance with this invention.

The particular liquid mixing device or mixer illustrated in the drawing is constructed so as to utilize the essentially intangible concepts or principles of the invention set forth and described in the appended claims forming a part of this disclosure. It is believed that it will be obvious from a consideration of this disclosure and the appended claims that those skilled in the design and construction of beverage mixers of the type briefly indicated in the preceding discussion will have little or no difficulty in utilizing these concepts or principles in other differently appearing and/or differently constructed mixers through the use or exercise of routine engineering skill.

DETAILED DESCRIPTION

In the drawing there is shown a mixer 10 which includes a base 12 which is adapted to rest upon a suitable supporting surface (not shown) and which carries an integral vertically extending support 14. The upper portion (not separately numbered) of the support 14 is shaped so as to include a hollow housing 16. This support 14 preferably is integral with a known type of support ledge 18 adapted to engage the bottom 20 of a conventional glass 22 serving as a vessel or container for a liquid to be mixed with the mixer 10.

Within the housing 18 there is located a conventional electric motor 24. A conventional switch (not shown) may be used to control the operation of the motor 24. This motor 24 is supported by a perforated cross plate 26 so that the shaft 28 of the motor 24 extends substantially vertically. An elongated generally tubular, resilient, elastomeric coupling 30 is used in connection with the shaft 28 so as to mechanically couple the shaft 28 with another shaft 32. This coupling 30 includes an elongated, centrally located passage or hole 34 into which both the shafts 28 and 32 are fitted.

This passage 34 is dimensioned so that the fit of the coupling 30 relative to the shafts 28 and 32 is sufficiently tight so that as the shaft 28 is turned through the operation of the motor 24 the shaft 32 will normally be turned at the same speed. This construction of the coupling 30 is considered to be advantageous as providing a clutch action in connection with the mechanical connection of the shafts 28 and 32 which will protect the motor 24 against damage in the event that for any reason the shaft 32 is precluded from rotating while the motor 24 is operating.

In the mixer 10 the coupling 30 is also utilized for another purpose. A peripheral groove 36 is provided on thous coupling 30 for the purpose of supporting the hub 38 of a propeller 40 so that the propeller 40 will be rotated as the shaft 28 rotates. Preferably the hub 38 should fit closely within the groove 36 so that there will normally be no slippage between the propeller 40 and the coupling 30. This propeller 40 is used for the purpose of moving air through holes 42 in the housing 16 and perforations 44 in the plate 26 so as to prevent overheating of the motor 24 as it is operating.

In the mixer 10 a conventional bearing 46 is utilized for the purpose of stabiling the shaft 32 so that its axis of rotation will not significantly shift or change during the operation of the motor 24. This bearing 46 is surrounded by an elastomeric collar 48 having a peripheral groove 50 engaged with a wall 52 of the housing 16 around an opening 54. Preferably the resilient elastomeric collar 48 fits tightly against the bearing 46. The shaft 32 is held in place with respect to the bearing 46 as a result of the bearing 46 being clamped against a flange 56 on the shaft 32 through the use of a conventional split ring 58 fitting within a groove 60 in the bearing 46. If desired a metal washer 62 may be utilized between the ring 58 and the collar 48.

The shaft 32 carries a comparatively small mixing disk 64. This disk 64 is considered to be quite important with respect to the present invention. It is located concentrically about the axis of the shaft 32 through the use of a concentrically located opening 66 extending into a hub 68 forming a part of this disk 64. The shaft 32 may conveniently be secured within the opening 66 in any established manner. This disk 64 has a small, flat upper surface 70 located on the upper most extremity of the hub 68.

This hub 68 is shaped generally as a frustrum of a right circular cone and is provided with equally spaced generally vertically extending ribs 72 essentially serving a decorative function. This hub 68 extends upwardly from a flat upper surface 74 of the disk 64 proper. This upper surface 74 is spaced a short distance from a flat lower surface 76 of the disk 64. All of these surfaces 70, 74 and 76 are located in planes which are perpendicular to the axis of the shaft 32.

During the use of the mixer 10 the disk 64 serves as a boundary layer type rotor and as a mixing element or structure. Its operation can be compared to the operation of closely related elements in boundary layer pumps and turbines such as have been developed by Nikola Tesla and many others. As the motor 24 is operated with the disk 64 in contact with a liquid or liquid mixture what may be referred to as a boundary layer effect causes the liquid present to tend to adhere to a degree to the surfaces 70, 74 and 76 and to the surface of the hub 68 to a degree sufficient so that the rotation of these surfaces imparts a degree of centrifugal force to such liquid tending to move such liquid both outwardly and somewhat tangentially from the disk 64.

Figure 2:
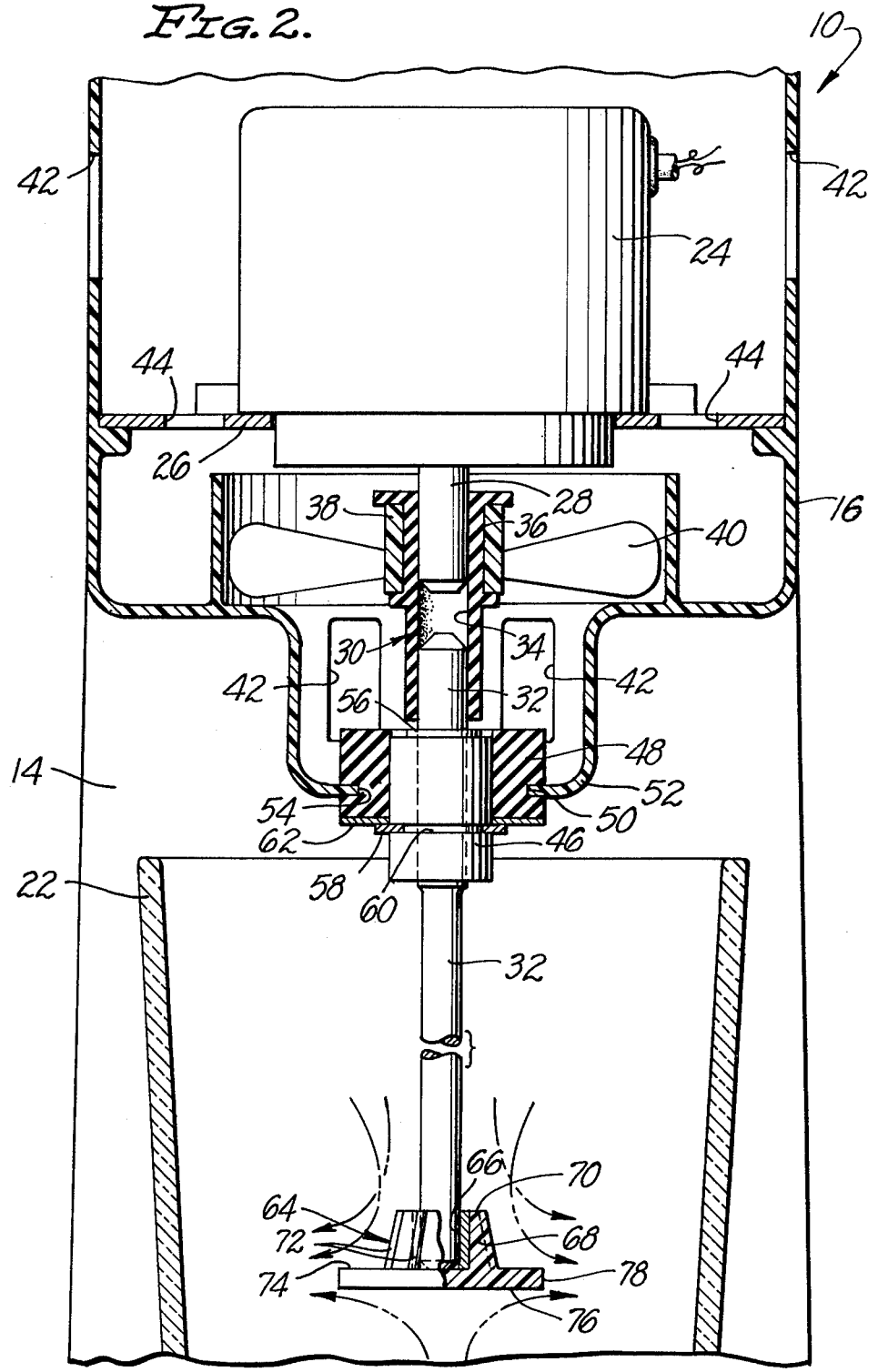
FIG. 2 is a cross sectional view taken at line 2—2 of FIG. 1 at an enlarged scale in which various dotted lines have been added to indicate generally the direction of fluid flow during the use of the mixer.

Only such outward movement is indicated by the dotted arrows shown in FIG. 2 because of the two dimensional character of the drawing.

It is noted that normally during the use of the mixer 10 with liquids such as are used in milkshakes, alcoholic beverages or the like the surface 70 on the hub 68 and the outer surface (not separately numbered) of the hub 68 are only operative to cause generally outward radial flow and rotational flow of the liquid present within the mixer as the operation of this mixer is commenced. This is because as the disk 64 is initially rotated at a comparitively high speed various comparitively complex considerations will normally result in the formation of a vortex which will normally extend downwardly through the liquid around the shaft 32 and down to adjacent to the vicinity of the hub 68 aand the upper surface 74 of the disk 64. The formation and operation of this vortex is considered quite important in the normal use of the mixer 10 in the preparation of beverages such as milkshakes and the like from liquids which are not sufficiently heavy or dense so that their weight precludes the formation of a vortex of a significant size.

It is considered that the upper surface 70 of the hub 68 normally serves a somewhat separate and distinct function through the operation of the boundary layer effect to separately cause outward and tangential type of movement in any liquid present as the disk 64 is initially rotated. At the same time, however, the surfaces 74 and 76 of the disk 64 also serve in this regard. To a degree the slope of the outer surface of the hub 68 will also tend to create a downward, outward flow generally toward the surface 64. The later flow will, of course, have a significant rotational component. As the result of this action as the disk 64 is initially rotated the upper surface 70 of the hub 68 and the hub 68 itself are considered to essentially serve a separate mixing function which tends to promote an extreme degree of turbulence in the liquid present and which tends to promote the formation of a vortex as indicated in the preceding. As this vortex forms it will normally extend to generally within the vicinity of the hub 68 and downwardly toward the upper surface 74. Normally it will be of a smallest dimension adjacent to the hub 68.

As the vortex forms the same boundary layer effect as has been used to promote liquid movement along the surface 70 and the surface of the hub 68 will next tend to cause movement of air generally downwardly and outwardly along the same surfaces so that such air will move to a significant extend roughly towards the surface 74. Generally along or adjacent to this surface 74 such air will be drawn into and mixed with the liquid moving outwardly and tangentially along or adjacent to the surface 74. This serves to provide or promote an action in the nature of a pumping action as far as air movement is concerned causing effective mixing of air within the liquid present.

Adjacent to the periphery 78 of the disk 64 extremely turbulent conditions will normally be present which will result in a complete and thorough mixing of both the liquid drawn upwardly from underneath the disk 64 and liquid moving downwardly generally along the shaft 32 with the air obtained as the result of the vortex action as indicated. It is considered that the edges (not separately numbered) between the cylindrical periphery 78 and the upper and lower surfaces 74 and 76 are important in promoting turbulence generally adjacent to the periphery 78 since they do not tend to promote comparatively "smooth" radial and tangential flow outwardly from the disk 64.

As the mixer 10 is operated after an initial period with a liquid as indicated in the preceding which permits the formation of the vortex as discussed the surfaces 74 and 76 will be the primary surfaces of the disk 64 which cause any significant liquid movement while the upper surface 70 and the surface of the hub 68 will primarily serve to cause movement of air so that such air is drawn downwardly through the vortex formed and then is mixed with the liquid present as described in the preceding. From this it will be apparent that the surface 70 and the surface of the hub 68 are utilized so as to initially cause liquid movement and then are subsequently utilized so as to cause air movement as the mixer 10 is operated under what may be considered to be normal conditions.

It is considered important to note that the mode of operation as described in the preceding is based on the assumption that the disk 64 is rotated in a fixed location relative to the glass 22 as the mixer 10 is operated. If the disk 64 or the shaft 32 were to be moved within the glass as they were rotated what may be regarded as a "balance" within the glass would be changed or altered. Any such change or alteration resulting from a change in position of the disk 64 and the shaft 32 during the rotation of these parts would to a degree effect the actions described in the preceding and might tend to set up a degree of resonance tending to cause "surging" manifested in the form of significant changes of the liquid levels within the glass 32. It is considered important to obtain an effective mixing action without surging.

Obviously such mixing is the objective of the use of the mixer 10. It is considered, however, that the mixing action achieved is unique in that the disk 64 is held so that the position of the axis of rotation of the shaft 34 does not vary to any significant or reasonably measurable extent as the motor 24 is operated. This is considered to be the result of the use of the coupling 30 and the collar 48 which effectively isolates the shaft 32 from any vibration present in the shaft 28 or from any vibration present in either the support 14 or the housing 16 as the result of the operation of the motor 24. As a result of the shaft 32 tending to rotate so that there is no variation in the position of its axis the disk 64 does not tend to cant or move relative to the liquid present. This is considered to assist in minimizing liquid surging or resonating with the glass 22 so that the upper level (not separately shown) of such liquid tends to move up and down. As a result of minimizing such surging or resonance the glass 22 will not normally tend to overflow unless filled to a comparitively extreme extent as the mixer 10 is operating.

The particular shape of the disk 64 is considered to be particularly advantageous as minimizing the chances of damage to the glass 22 or any other similar vessel used with the mixer 10 if such glass 22 should come into contact with the disk 64 as the disk 64 is rotated. In order to minimize the chances of such damage to as great a degree as possible it is preferred to manufacture the disk 64 out of a comparatively hard, nonresilient polymer which will withstand the stresses and strains set up within the disk 64 during the operation of the mixer 10. These stresses and strains are considered to be reasonably significant because normally a mixer corresponding to the mixer 10 will be operated with a shaft speed of from about 14,000 to about 19000 RPM. Unless a motor 24 is employed which operates at a constant speed regardless of loading the precise speed will depend upon the "drag" exerted on the disk 64 and thus on the motor 24 as a result of the nature of the liquid or liquids used in the mixer 10.

The use of the disk 64 is also considered to be advantageous in other regards, Because of the nature of this disk it will not operate so as to significantly abrade or otherwise tend to grind up most solids or very firm coherent non-thixotropic gels present within any liquid mixed using the mixer 10. This can be advantageous when nuts and the like are to be incorporated in a beverage or batter or a similar mixture. It is to be noted, however, that because the disk 64 dies not normally project all the way to the bottom of the glass 22 or a similar vessel used with the mixer 10 that any particular of such solids or gels should preferably be of the same or about the same density as the liquid mixture prepared or should be significantly small so that they can be readily entrained with the liquid present as the mixer 10 is operated.

We claim:

1. A mixing device having a support, a motor mounted on said support, said motor having a rotatable output shaft, another shaft located in a generally vertical direction, the upper end of said other shaft being operatively connected to said output shaft so that operation of said motor causes rotation of said other shaft and fluid movement means located on said other shaft remote from the upper end of said other shaft in which the improvement comprises:

vibration absorbing means spaced from said fluid movement means and mechanically coupling said other shaft and said output shaft and supporting said other shaft so that vibration resulting from the operation of said motor will not cause the position of the axis of rotation of said other shaft to change as said motor is operated and, said vibration absorbing means includes, an elastomeric, flexible coupling directly coupling said output and said other shafts, and bearing means engaging and stabilizing said other shaft, and elastomeric flexible mounting means mounting said bearing means in said support, said fluid movement means comprises a disk having flat upper and lower surfaces and a smooth periphery attached to said other shaft so as to extend outwardly around said other shaft in a plane perpendicular to the axis of rotation of said other shaft, said disk being located symmetrically with respect to said other shaft, said disk has flat upper and lower surfaces extending perpendicular to the axis of rotation of said other shaft and a periphery separating said upper and lower surfaces, said periphery is of a cylindrical configuration, said disk includes a hub shaped as a frustrum of a right circular cone, said hub being located symmetrically about said shaft on said upper surface of said disk, said hub having a flat upper surface remote from said surfaces of said disk extending in a plane perpendicular to the axis of rotation of said other shaft and being located symmetrically around said shaft, said disk serving as a boundary layer type rotor in which boundary layer effects will occur along the surfaces of said disk during rotation of said disk, said boundary layer effect causing liquid to move in a downward, outward manner generally adjacent to the outer surface of said hub while concurrently liquid flows in an outward, tangential manner generally adjacent to said flat upper surface of said hub and generally adjacent to the flat upper surface of said disk, such flow adjacent to said hub tending to promote turbulence and mixing and tending to promote vortex formation generally within the vicinity of said hub.

* * * * *